United States Patent Office 3,448,065
Patented June 3, 1969

3,448,065
POLYURETHANE CATALYSIS EMPLOYING N-HYDROXYALKYL SUBSTITUTED IMIDAZOLE
Harold A. Green, Havertown, Pa., assignor to Air Products and Chemicals, Inc., Philadelphia, Pa., a corporation of Delaware
No Drawing. Filed Sept. 7, 1965, Ser. No. 485,547
Int. Cl. C08g 22/48, 23/06
U.S. Cl. 260—2.5
10 Claims

ABSTRACT OF THE DISCLOSURE

Methods of producing improved polyurethane foams are disclosed which utilize catalysts made by reacting from 1 to 20 mols of an epoxide-containing compound with 1 mol of a substituted or unsubstituted imidazole compound to obtain N-hydroxyalkyl substitution. The novel catalysts may be used alone or in conjunction with tertiary amines and/or tin salts.

---

The present invention relates to the production of high molecular weight polyurethane condensation products and more particularly, to the catalysts of such products with N-hydroxyalkyl substituted imidazoles.

Preparative procedures for polyurethane foams, both of the rigid and flexible type, and non-cellular polyurethane products, including elastomers, coatings, adhesives, films and the like, are well established in the art. Although polyurethanes can be formed by a variety of methods, the most widely used production method is the reaction of di- or poly-functional hydroxy compounds, e.g., hydroxy-terminated polyesters or polyethers, with di- or poly-functional isocyanates.

In typical practice for foam production using the "one-shot" technique, all of the ingredients except the isocyanate are premixed and the latter is then added to effect the reaction. In other systems, all or part of the isocyanate is pre-reacted with the polyol to produce an isocyanate-terminated prepolymer, which is then reacted with additional reactants, such as water, in the presence of catalyst to obtain products of the desired properties. In formulations used in the preparation of polyurethane foams, the blowing agent may be a gas, such as carbon dioxide, which is formed in the reaction or an external blowing agent supplied in the form of compressed inert gas or a liquid capable of vaporizing at or below the reaction temperature.

The successful preparation of urethane polymers requires a proper choice of reactants to give the desired polymer structure and adequate control of the occurring reactions. Some control of the reactions may be obtained by the choice of reactants, ratio of reactants and temperature of the reaction.

Typical polyol compounds which have been used in high molecular weight polyurethane plastic and resin compositions include:

(a) Hydroxy polyester compounds illustrated by esters of polycarboxylic acids with polyhydroxy alcohols (alkyd resin type) in general and particularly adipates and phthalates of glycerol, glycols and of glycol ethers; hydroxyesters of dimerized higher fatty acids with dihydric or polyhydric alcohols.

(b) Polyether glycols (diols) of 500 to 3000 or higher molecular weight, for example, 1,4-butylene oxide polyglycol and mixed polypropylene-polyethylene glycols; so-called "triols" formed from tri-functional polyols by condensation with ethylene oxides and/or propylene oxide, using as tri-hydroxy base glycerine or trimethylol propane; as well as higher hydroxy compounds based hexahydric alcohols such as sorbitol.

(c) Glycol, glycerine or other polyhydric alcohol derivatives of alkylene polyamines, such as N,N'-tetrakis-(2-hydroxypropyl)ethylenediamine.

(d) Castor oil and its derivatives including ricinoleic acid esters, ricinoleyl alcohol and condensation products of castor oil with glycols or with diglycolic acid.

While tolylene diisocyanate has been the diisocyanate most frequently employed in foam polyurethane, particularly as mixtures of 2,4- and 2,6-isomers, these, as well as other organic polyisocyanates, have been used in non-cellular polyurethane formulations of varying types, including, for example; m-phenylene diisocyanate, hexamethylene diisocyanate, 4,4'-methylene bis-(phenyl isocyanate), naphthalene, diisocyanate, triphenylmethane triisocyanate. Also included are the prepolymers having terminal isocyanate groups forms by condensation with polyols, and the dimers and trimers of aryl diisocyanates.

The above examples of polyols and polyisocyanates are merely illustrative of the wide range of formulations in which the catalyst of the invention can be employed and are by no means intended as exhaustive or limiting.

The greatest control of polyurethane reactions is realized by the proper choice of catalyst. Among the most effective catalysts for promoting different isocyanate reactions have been catalysts of the tertiary amine type. Among these, n-alkyl morpholines, such as n-ethyl morpholine (NEM), triethylamine and, more recently, triethylenediamine (1,4 - diazabicyclo - 2.2.2 - octane) have been widely used. However, with some tertiary amine-type catalysts toxicity and other handling problems such as odor are significant problems.

It has now been discovered that certain N-hydroxyalkyl substituted imidazoles exhibit useful catalytic activity in polyurethane formulations utilizing reactions between polyol compounds and organic diisocyanates. These N-hydroxyalkyl substituted imidazoles are prepared by reacting an epoxide containing compound having the structure

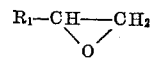

where $R_1$ is hydrogen, an alkyl radical of 1 to 16 carbon atoms, an aryl radical of 6 to 10 carbon atoms or a phenoxyalkyl radical of 7 to 9 carbon atoms, with an imidazole compound having the structure

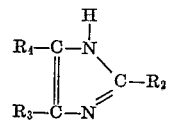

where $R_2$, $R_3$ and $R_4$ are independently selected from hydrogen, alkyl radicals of 1 to 17 carbon atoms or aryl radicals of 6 to 10 carbon atoms, provided that not more than one of the members $R_2$, $R_3$ and $R_4$ is an aryl radical. Typical epoxide-containing compounds include alkylene oxides, such as ethylene oxide, octylene oxide and octadecylene oxide, styrene oxide and phenylglycidyl ether. Typical imidazole compounds include imidazole, 2-ethyl-4-methyl imidazole, 2-phenyl imidazole, 2,4,5-tripropyl imidazole, 2 - heptadecyl imidazole, 2 - naphthyl - 4,5-dimethyl imidazole and 2-undecenyl imidazole. While equimolar stoichiometric ratios of the reactants may be used, adducts or coadducts may also be prepared employing up to 20 mols of at least one epoxide-containing compound per mol of the imidazole compound.

Without being bound by the theory advanced, it is believed that the hydroxyl group of the hydroxyalkyl-substituted imidazoles reacts with isocyanate and becomes an integral part of the cured polymer. This mechanism is supported by the fact that there is no odor problem associated with the final product.

Imidazoles unsubstituted in the one-position are known to generally have high boiling points (greater than 250°) and to be highly associated at room temperatures. These imidazoles apparently dissociate, however, at elevated temperatures. This heat activation effect would account for reports which indicate that 2-methyl imidazole and 2-ethyl-4-methyl imidazole have a tendency toward closed-cell formation—an objectionable property for most polyester polyurethane applications. Open cell polyester foam is particularly desired for textile lamination which represents a large portion of the polyester market.

In accordance with another aspect of the present invention, polyurethane foam compositions are provided containing N-hydroxyalkyl-substituted imidazoles in combination with one or more active catalysts promoting the acceleration of the reaction between polyols and organic diisocyanates. Typical catalysts which may be utilized advantageously with the N-hydroxyalkyl-substituted imidazoles include the tertiary amine type, such as triethylenediamine, and the metal salt type, such as tin soaps and aliphatic $C_5$ to $C_{17}$ carboxylic acid salts of stannous tin.

The invention is further clarified by reference to the following examples.

EXAMPLE I 330 grams of 2-ethyl-4-methyl imidazole were added to 500 milliliters of toluene in a 2-liter vessel. 250 milliliters of propylene oxide were then added to the vessel drop-wise over a one and a half-hour period. During this period, the vessel was agitated and maintained at about 80° C.

N-hydroxypropyl-2-ethyl-4-methyl imidazole was recovered following removal of solvent from the reaction product.

EXAMPLE II 275.5 grams of 2-methyl imidazole and 600 milliliters of toluene were added to a 2-liter vessel and heated to about 80° C. 260 milliliters of propylene oxide were then added drop-wise over a one and one-half hour period. The solvent was removed by distillation and 503 grams of N-hydroxy propyl 2-methyl imidazole were recovered having a boiling point of about 190° C.

EXAMPLE III 75 grams of ethylene oxide were added to 115 grams of imidazole dissolved in 250 milliliters of toluene. After removing the solvent, 175 grams of amber product, 1-hydroxyethyl imidazole, were recovered.

EXAMPLE IV 164 grams of 2-methyl imidazole were dissolved in 250 milliliters of toluene. 256 grams of octylene oxide were added drop-wise over a two-hour period while the solution was maintained at 90 to 100° C. N-hydroxyoctyl-2-methyl imidazole was recovered following removal of solvent from the solution.

EXAMPLE V 360 grams of styrene oxide were added drop-wise over a two-hour period to a 80–90° C. solution of 246 grams of 2-methyl imidazole dissolved in 250 milliliters of toluene. After four hours, the solvent was removed and N(2-phenylhydroxyethyl)-2-methyl imidazole was recovered.

EXAMPLE VI

An adduct of ethylene oxide and imidazole was obtained by adding 620 grams (14 mols) of ethylene oxide to a solution of 68 grams (1 mole) of imidazole dissolved in toluene.

EXAMPLE VII

The following table compares the activity of N-hydroxy alkylated imidazoles with other imidazoles and tertiary amines as polyurethane catalysts by the Wolfe Test Procedure. (H. H. Wolfe, Du Pont Foam Bulletin, March 16, 1960.) In this table 2-ethyl-4-methyl imidazole has been identified as EMI, 2-methyl imidazole has been identified as MI, and N-ethyl morpholine has been identified as NEM.

| Urethane reaction | Concentration (parts by wt./100 parts polyol) | Order of reactivity |
|---|---|---|
| EMI | 0.10 | 28 |
| MI | 0.10 | 38 |
| N-hydroxy propyl EMI | 0.10 | 58 |
| Do | 0.05 | 34 |
| Do | 0.033 | 28 |
| N-hydroxy propyl MI | 0.10 | 82 |
| Do | 0.056 | 51 |
| Do | 0.033 | 30 |
| Triethylenediamine | 0.10 | 171 |
| NEM | 0.10 | 41 |

| Water reaction | Concentration (parts by wt./100 parts polyol) | Order of activity [1] |
|---|---|---|
| NEM | 0.15 | 1.6 |
| EMI | 0.45 | 1.6 |
| MI | 0.45 | 1.6 |
| N-hydroxy propyl EMI | 0.18 | 1.9 |
| Do | 0.09 | 1.6 |
| Do | 0.18 | 2.0 |
| N-hydroxy propyl MI | 0.08 | 1.6 |
| Do | 0.047 | 1.6 |
| Triethylenediamine | 0.18 | 4.9 |

[1] Compared to stannous octoate, 1.0.

The above tests indicate a two to three-fold increase in activity for the hydroxy alkylated imidazoles over the N-unsubstituted imidazoles and about a two-fold increase for the N-hydroxy alkylated imidazoles as compared with NEM.

EXAMPLE VIII

The production of polyether-type polyurethane foam by the "one-shot" technique has been possible heretofore with only a few of the catalysts otherwise useful in polyurethane formulations.

| Components used in formulation (grams): | | | | | |
|---|---|---|---|---|---|
| Stannous octoate | 0.4 | 0.4 | 0.4 | 0.4 | 0 |
| Glycerine polypropylene oxide triol (3000 molecular Wt., hydroxyl No. 56) | 200 | 200 | 200 | 200 | 200 |
| Water | 7 | 7 | 7 | 7 | 7 |
| Organo-silicone stabilizer (prepared by block polymerization of polypropylene glycol with dimethyl silicone) | 3 | 3 | 3 | 3 | 3 |
| Tolylene diisocyanate | 89.4 | 89.4 | 89.4 | 89.4 | 89.4 |
| N-hydroxyethyl imidazole | 0.2 | | | | |
| N-hydroxyethyl EMI | | 0.25 | | | |
| N-hydroxypropyl EMI | | | 0.25 | | |
| Ethylene oxide, MI adduct [1] | | | | 0.25 | |
| Do [2] | | | | | 0.25 |
| Cream time (seconds) | 22 | 20 | 27 | 20 | 23 |
| Mix time (seconds) | 10 | 10 | 10 | 10 | 10 |
| Rise time (seconds) | 175 | 147 | 203 | 153 | 210 |

[1] Prepared using 2 mols of ethylene oxide per mole of 2-methyl imidazole.
[2] Prepared using 8 mols of ethylene oxide per mole of 2-methyl imidazole.

The N-substituted imidazole component was blended with all of the components except the diisocyanate by mixing with a high speed agitator for five seconds. The diisocyanate was then added and the mixture further agitated. The resulting mixtures were poured into molds. The obtained flexible foams showed good cell structure, good stability and negligible shrinkage on aging.

Because of the unique properties of these hydroxy substituted imidazoles, they may be employed with particular advantage with stannous soaps in polyurethane foam formulations. Stannous octoate, for example, has exceptionally high activity in promoting polymer growth in the polyol-isocyanate (urethane) reaction. For example, the viscosity of the urethane mix containing stannous octoate goes from about 300 centistrokes to about 900 in ten minutes, reaching 2000 or more in less than 18 minutes. In comparison, a urethane mix containing dibutyl-tin dilaurate after 20 minutes reached a viscosity of only about 700 centistrokes, and dibutyl-tin dioctoate (2-ethyl-hexoate) was even less active. On the other hand, stannous octoate is competitively poor as a catalyst in promoting carbon dioxide evolution not only when compared with the dibutyl-tin salts but even as compared with the relatively low activity tertiary amine catalysts such as N-alkyl morpholines.

EXAMPLE IX

Following the one-shot procedure of Example VIII, foams of well-developed cell structure and good stability were prepared from the following formulations.

| Components | Parts by weight (grams) | | | |
|---|---|---|---|---|
| Glycerine polypropylene oxide triol (3,000 M.W.; 56 OH number) | 200 | 200 | 200 | 200 |
| Water | 7 | 7 | 7 | 7 |
| Organo-silicone stabilizer (prepared by block polymerization of polypropylene glycol with dimethyl silicone) | 3 | 3 | 3 | 3 |
| Stannous octoate | 0.4 | 0.4 | 0.4 | 0.4 |
| Tolylene diisocyanate | 89.3 | 89.3 | 89.6 | 89.6 |
| N-hydroxyethyl MI | 0.2 | 0.25 | | |
| N-(2-phenyl, 2-hydroxy ethyl) MI | | 0.25 | 0.8 | |
| N-hydroxy octyl MI | | | | 0.8 |
| Cream time (seconds) | 20 | 18 | 25 | 20 |
| Rise time (seconds) | 155 | 145 | 255 | 165 |
| Mix time (seconds) | 10 | 10 | 10 | 10 |

Accordingly, ready-mix catalyst combinations for various types of formulations may be prepared in which the imidazole-stannous soap weight ratio will generally lie in the range of from about 0.5 to 1 to 5 to 1, and the combined catalyst will be used in amounts of from about 0.25 to 1.0 parts per hundred of polyol. If it is desired to employ a higher ratio of imidazole to stannous soap than that contained in the ready-mix catalyst solution, the same can be adjusted by further addition of more N-hydroxyalkyl substituted imidazole in the desired quantity while the components are being mixed or added to one of the compatable components of the mix.

Examples of other stannous soaps which may be similarly employed include: stannous laurate, stannous decanoate, stannous azelate, stannous myristate, stannous oleate, etc.

In the foregoing examples, the preparation of "one-shot" polyether foams is described. It will be understood that the use of the N-hydroxyalkyl substituted imidazoles as catalyst or co-catalyst is not limited thereto, but that the N-hydroxyalkyl substituted imidazoles can be employed in whole or part for the tertiary amine catalysts used in conventional polyether foam formulations using the prepolymer technique. The N-hydroxyalkyl substituted imidazoles can also be used in polyurethane foam products based on the use of polyester intermediates such as those derived from polymerized higher fatty acids (dimer acids), reaction products of a polyhydric alcohol or polyhydric etheralcohol with a polycarboxylic acid, such as diethylene glycol adipate, etc.

EXAMPLE X

Polyester foam formulations were prepared by premixing catalyst, 7.2 grams of water and 3 grams of surfactant. This solution was then mixed for 30 seconds with 200 grams of a glycol-adipate polyester resin having an OH number of 50–55 and then mixed for 10 seconds with 87 grams of tolylene diisocyanate.

| Catalyst | Parts by weight (grams) | Cream time (seconds) | Rise time (seconds) |
|---|---|---|---|
| NEM | 4 | 15 | 90 |
| N-hydroxy propyl EMI | 0.67 | 20 | 140 |
| N-hydroxy propyl MI | 2.0 | 10 | 60 |
| Do | 1.3 | 15 | 90 |
| Stannous octoate | 0.02 ⎱ | 20 | 100 |
| N-hydroxy propyl MI | 1.3 ⎰ | | |
| N-hydroxy propyl MI | 1.0 ⎱ | 20 | 100 |
| Triethylenediamine | 0.02 ⎰ | | |
| N-hydroxy propyl MI | 1.0 ⎱ | 15 | 90 |
| Triethylenediamine | 0.04 ⎰ | | |
| N-hydroxy propyl MI | 0.67 | 17 | 95 |

In each instance, the appearance of the resulting foam was predominantly open cell. Little or negligible shrinkage was observed.

EXAMPLE XI

Good foams were produced using 1-hydroxypropyl-2-methyl imidazole as catalyst in the following formulation:

| Component | Formulation 1 (parts by wt.) | Formulation 2 (parts by wt.) |
|---|---|---|
| (A) Glycerine polypropylene oxide triol (molecular wt. about 3,000, hydroxyl # 56) | 200 | 200 |
| (B) Organo-silicone stabilizer (prepared by block polymerization of polypropylene glycol with dimethyl silicone) | 2 | 2 |
| (C) Stannous octoate | 0.6 | 0.6 |

Components A, B and C were then mixed for 15 seconds with components D and E.

| Component | Formulation 1 (parts by wt.) | Formulation 2 (parts by wt.) |
|---|---|---|
| (D) 1-hydroxy propyl MI (in 7 cc's of water) | 0.1 | 0.2 |
| (E) Trichlorofluoromethane | 12 | 12 |

The formulation was then mixed with component F for 15 seconds.

| Component | Formulation 1 (parts by wt.) | Formulation 2 (parts by wt.) |
|---|---|---|
| (F) Tolylene diisocyanate | 89.6 | 89.6 |

Resulting formulation 1 was mixed for 10 seconds while formulation 2 was mixed for 15 seconds. The formulations had a complete rise time of 90 seconds. Their visual appearance was good and shrinkage was found to be negligible.

Obviously, many modifications and variations of the invention as hereinbefore set forth may be made without departing from the spirit and scope thereof, and therefore only such limitations should be imposed as are indicated in the appended claims.

What is claimed is:

1. The method of producing gas blown polyurethane foam which comprises reacting tolylene diisocyanate with water and with a polyalkylene ether polyol in the presence of an effective amount of a catalyst mixture composed of triethylenediamine and an N-hydroxyalkyl substituted imidazole said imidazole having been prepared in the absence of water by reacting from one to twenty mols of an epoxide containing compound having the structure

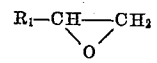

where $R_1$ is selected from the group consisting of hydrogen, an alkyl radical of 1 to 16 carbon atoms, an aryl radical of 6 to 10 carbon atoms and a phenoxyalkyl radical of 7 to 9 atoms, with one mol of an imidazole compound having the structure

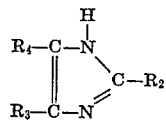

where $R_2$, $R_3$ and $R_4$ are independently selected from the group consisting of hydrogen, alkyl radicals of 1 to 17 carbon atoms and aryl radicals of 6 to 10 carbon atoms, provided that, at most, only one member of $R_2$, $R_3$ and $R_4$ is an aryl radical.

2. The one-shot method of producing polyurethane foam which comprises reacting tolylene diisocyanate with water and with a polyalklene ether polyol of 500 to 5000 molecular weight in the presence of an effective amount of a catalyst mixture composed of stannous octoate and N-hydroxyalkyl substituted imidazole said imidazole having been prepared in the absence of water by reacting from one to twenty mols of an epoxide containing compound having the structure

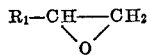

where $R_1$ is selected from the group consisting of hydrogen, an alkyl radical of 1 to 16 carbon atoms, an aryl radical of 6 to 10 carbon atoms and a phenoxyalkyl radical of 7 to 9 carbon atoms, with one mol of an imidazole compound having the structure

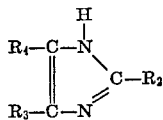

where $R_2$, $R_3$ and $R_4$ are independently selected from the group consisting of hydrogen, alkyl radicals of 1 to 17 carbon atoms and aryl radicals of 6 to 10 carbon atoms, provided that, at most, only one member of $R_2$, $R_3$ and $R_4$ is aryl radical.

3. The method of preparing noncellular polyurethane resins which comprises mixing an organic polyisocyanate with high molecular weight organic polyol, containing at least two active alcoholic hydroxyl groups, in the presence of a catalytically effective amount of an N-hydroxyalkyl substituted imidazole catalyst and heating the system to accelerate the catalyzed reaction between hydroxyl and isocyanate groups, thereby forming urethane linkages, said N-hydroxyalkyl substituted imidazole having prepared in the absence of water by reacting from one to twenty mols of an epoxide containing compound having the structure

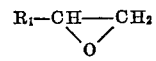

where $R_1$ is selected from the group consisting of hydrogen, an alkyl radical of 1 to 16 carbon atoms, an aryl radical of 6 to 10 carbon atoms and a phenoxyalkyl radical of 7 to 9 carbon atoms, with one mol of an imidazole compound having the structure

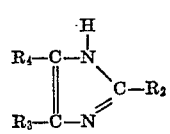

where $R_2$, $R_3$ and $R_4$ are independently selected from the group consisting of hydrogen, alkyl radicals of 1 to 17 carbon atoms and aryl radicals of 6 to 10 carbon atoms, provided that, at most, only one member of $R_2$, $R_3$ and $R_4$ is an aryl radical.

4. In the production of polyurethanes from the reaction of polyols and polyisocyanates, the improvement which comprises conducting the reaction in the presence of an effective amount of a catalyst comprising an N-hydroxyalkyl substituted imidazole; said N-hydroxyalkyl imidazole being prepared in the absence of water by reacting from one to twenty mols of an epoxide-containing compound having the structure:

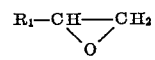

wherein $R_1$ is selected from the group consisting of H, a $C_1$–$C_{16}$ alkyl radical, an aryl radical having from 6 to 10 carbon atoms and a phenoxyalkyl radical having 7 to 9 carbon atoms.

with one mol of an imidazole compound having the structure:

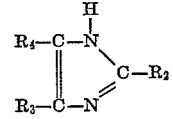

wherein each of $R_2$, $R_3$ and $R_4$ is independently selected from the group consisting of H, a $C_1$–$C_{17}$ alkyl radical, and an aryl radical having from 6 to 10 carbon atoms, provided that no more than one of $R_2$, $R_3$ and $R_4$ is an aryl radical.

5. The method of claim 4 wherein said polyurethane is produced by the reaction of an organic polyisocyanate with a polyester polyol.

6. The method of claim 4 wherein said polyurethane is produced by the reaction of an organic polyisocyanate with a polyether polyol.

7. The method of claims 4, 5 or 6 wherein $R_1$ is $CH_3$; $R_2$ is $CH_3$ and both $R_3$ and $R_4$ are hydrogen.

8. The method of claims 4, 5 or 6 wherein $R_1$ is $CH_3$; $R_2$ is $C_2H_5$, $R_3$ is $CH_3$ and $R_4$ is hydrogen.

9. The method of claims 4, 5 or 6 wherein $R_1$, $R_3$ and $R_4$ are all hydrogen and $R_2$ is $CH_3$.

10. The method of claims 4, 5 or 6 wherein $R_1$ and $R_4$ are hydrogen, $R_2$ is $C_2H_5$ and $R_3$ is $CH_3$.

References Cited
UNITED STATES PATENTS

| | | | |
|---|---|---|---|
| 2,866,762 | 12/1958 | Brochhagen et al. | 260—2.5 |
| 3,010,963 | 11/1961 | Erner | 260—268 |
| 3,177,223 | 4/1965 | Erner | 260—309 |
| 3,221,016 | 11/1965 | Currier et al. | 260—268 |
| 3,294,753 | 12/1966 | Beitchman, et al. | 260—77.5 |

HOSEA E. TAYLOR, JR., *Primary Examiner.*

M. B. FEIN, *Assistant Examiner.*

U.S. Cl. X.R.

260—75, 77.5, 348

PO-1050
(5/69)

UNITED STATES PATENT OFFICE
CERTIFICATE OF CORRECTION

Patent No. 3,448,065          Dated June 3, 1969

Inventor(s) Harold A. Green

It is certified that error appears in the above-identified patent and that said Letters Patent are hereby corrected as shown below:

Column 1, line 24, "catalysts" should read --catalysis--.

Column 2, line 8, "Polyurethane" should be plural.

Column 2, line 16, "forms" should read --formed--.

Column 3, line 3, "temperatures" should be singular.

Column 4, Ex. VIII, Table, first line, last column, "0" should read --0.4--.

Column 5, Ex. IX, Table, tenth line, second column shows "0.25" and this should be omitted.

Claim 1, line 13 thereof, after "9", the word --carbon-- should be inserted.

Claim 2, line 25 thereof, after "is", the word --an-- should be inserted.

SIGNED AND
SEALED
MAR 17 1970

(SEAL)
Attest:

Edward M. Fletcher, Jr.
Attesting Officer

WILLIAM E. SCHUYLER, JR.
Commissioner of Patents